United States Patent
Aslanis et al.

[11] Patent Number: 5,813,904
[45] Date of Patent: Sep. 29, 1998

[54] METHOD AND APPARATUS FOR SKINNING FROZEN FISH

[75] Inventors: Konstantinos Aslanis, Milton; Thomas Joseph Parenteau, Brockton; James Robert Dawson, Peabody, all of Mass.

[73] Assignee: Aslanis Seafoods, Inc., Quincy, Mass.

[21] Appl. No.: 627,420

[22] Filed: Apr. 4, 1996

[51] Int. Cl.$^6$ .................................................. A22B 5/16
[52] U.S. Cl. ............................................ 452/133; 452/101
[58] Field of Search ............................... 452/133, 132, 452/101, 102, 105

[56] References Cited

U.S. PATENT DOCUMENTS

| | | | |
|---|---|---|---|
| 1,642,802 | 9/1927 | Barry | 452/101 |
| 1,921,055 | 8/1933 | Vucassovich . | |
| 1,921,440 | 8/1933 | Taylor . | |
| 2,557,272 | 6/1951 | Gabriel | 452/101 |
| 2,598,509 | 5/1952 | Corbin | 452/101 |
| 2,884,658 | 5/1959 | Johnson . | |
| 3,590,424 | 7/1971 | Shults | 452/101 |
| 3,729,775 | 5/1973 | McDonald . | |
| 3,806,616 | 4/1974 | Mencacci et al. . | |
| 4,063,332 | 12/1977 | McCullough . | |
| 4,071,923 | 2/1978 | Smith | 452/133 |
| 4,451,953 | 6/1984 | Leining | 452/133 |
| 4,602,404 | 7/1986 | Betnar . | |
| 4,631,780 | 12/1986 | Leining . | |
| 4,765,030 | 8/1988 | Dubowik . | |
| 4,993,112 | 2/1991 | Burnett et al. . | |
| 5,221,229 | 6/1993 | Brophy | 452/101 |

*Primary Examiner*—Willis Little
*Attorney, Agent, or Firm*—Testa, Hurwitz & Thibeault, LLP

[57] ABSTRACT

Disclosed is an improved method and apparatus for removing tough, inedible skin and underlying fat from a frozen fish such as tuna, marlin, shark, and swordfish. The apparatus includes a high speed, contoured rotary cutter disposed in a housing with a tailored aperture through which is exposed a limited sector portion of the cutter. The apparatus is manually applied to the frozen fish and traversed across the fish in a series of passes to effectively and efficiently denude the fish of substantially all of the skin and fat. A depth of cut guide precludes burrowing of the cutter into the comestible flesh thereby maintaining high yield.

21 Claims, 2 Drawing Sheets

METHOD AND APPARATUS FOR SKINNING FROZEN FISH

TECHNICAL FIELD

The present invention relates to seafood processing and more particularly to an improved method and apparatus for removing skin from frozen fish.

BACKGROUND INFORMATION

Removal of skin from fresh fish may be accomplished conventionally by hand with a knife, but is often facilitated or supplanted by chemical, thermal, fluidic, or automated mechanical methods to enhance efficiency and minimize waste. For example, U.S. Pat. No. 3,806,616 issued to Mencacci et al. discloses that in the processing of tuna, the skin may be removed by water jets after the fish has been treated with a heated caustic sodium hydroxide solution, which reduces adherence of the skin to the underlying flesh and also tends to dissolve the skin itself.

Whether the fish is fresh, frozen, thawed, or cooked limits the applicability of conventional skin removal techniques; therefore, the form of the fish at stages between harvest and consumption dictates the opportunity and methodology for skinning the fish. Large, commercially harvested fish such as tuna, marlin, shark, and swordfish are routinely frozen at sea shortly after capture to prevent deterioration of the comestible flesh during an extended voyage. In order to provide for efficient operations on the ship and minimize requisite cold storage volume, the catch is often eviscerated and the head, tail, and fins removed prior to freezing; however, the skin is not removed typically at this stage of processing. There are several reasons for this practice. First, the skin acts as a protective covering, preventing damage to the flesh during initial handling of the fresh fish on the ship. The skin also protects the flesh during freezing by reducing dehydration thereof. Further, removal of skin from large fresh fish can be a difficult, labor intensive, costly, and time consuming practice, especially on a ship at sea. Accordingly, skin removal is often relegated to a later stage in the processing of the fish, if done at all.

Some fish, such as those with edible skin, need not be skinned and are often served with the skin intact. In the case of fish such as swordfish and shark with tough, inedible skin, however, while it is desirable to remove the skin, no opportunity in the processing avails itself to this step according to conventional methods. Typically, a loin of frozen swordfish received from the fishing vessel is merely sliced into radial steaks on a bandsaw and distributed frozen to restaurants and retail markets. The fish steak is cooked and served with the skin intact, requiring the consumer to remove the skin.

While several techniques for removing the skin in one piece from frozen fish are known, such methods routinely entail complex, energy intensive apparatus such as those which preferentially freeze or thaw either the skin or the flesh to facilitate separation therebetween. Alternatively, brute force methods involving cutting away the frozen skin using a bandsaw create unacceptably large waste. For example, in the case of a frozen swordfish loin, attempts to skin the entire frozen loin are frustrated by the variable contours and curvatures of the loin, as well as the size and weight of the loin. A typical loin may have a length of about a meter and weigh some fourteen to eighteen kilograms, although much larger loins weighing up to several hundred kilograms or more are not uncommon. If first cut into steaks, the swordfish pieces can be manipulated more readily; however, direct labor costs typically increase since a plurality of steaks must be skinned individually.

Swordfish also contains a relatively large amount of fat and oils in a layer disposed between the outer skin and the comestible flesh. While edible, the existence of the fat layer is cause for concern amongst some consumers who wish to reduce oil intake. As a result it is desirable to remove a substantial amount of the fat layer with the skin before the swordfish is cooked.

Accordingly, there exists a need in the art for a cost efficient, high yield method and apparatus for removing skin from frozen fish, which is readily adaptable to frozen fish of variable size, contour, and configuration having tough, inedible skin.

SUMMARY OF THE INVENTION

An improved frozen fish skinning method and apparatus are disclosed, primarily for use on large, commercially harvested fish with tough, inedible skin such as swordfish, shark, tuna, marlin, and other related fish, although the invention may also be used to remove edible skin. The apparatus includes a concave cutter of unitary construction having a plurality of integral, longitudinally extending teeth disposed about a periphery thereof. The contour of the cutter is generally designed to match the flattest contour of the fish to be skinned. The cutter is supported for rotation parallel to a longitudinal axis of a housing configured to be grasped by a user and is driven by a flexible shaft or other power source. In one embodiment, the apparatus further includes a guide to limit the depth of cut of the cutter to no more than about the thickness of the skin and any fat layer disposed between the skin and the comestible flesh.

According to the method of the invention, frozen fish is provided and suitably restrained from motion at an operator workstation. The rotating cutter is brought into contact with the frozen skin on the fish and traversed across the fish in a series of passes to effectively and efficiently denude the fish of substantially all of the skin. Much of the fat layer is concomitantly scraped away by the action of the cutter and the depth of cut guide. High yield is maintained by employing the guide to preclude burrowing of the cutter into the flesh, so that solely the undesirable skin and fat are removed.

While there are known in the art rotary powered, handheld fish cleaning or skinning devices useful for removing the skin from cooked fish and fish scaling devices useful for removing scales from fresh fish, such devices are inapplicable for use in skinning frozen fish. See, for example, U.S. Pat. No. 2,884,658 issued to Johnson and U.S. Pat. No. 4,063,332 issued to McCullough. These light-duty devices are often powered by air motors which do not develop the rotational speed, torque, or power necessary to sustain rigorous chipping and discharge of frozen skin in accordance with the teachings herein. Further, the rotary tools typically employed therewith are delicate and suited for brushing of cooked skin or scraping of scales and are wholly unsuitable for removal of the quantity and consistency of fat laden frozen skin in accordance with the teachings of the invention.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which.

DESCRIPTION OF THE INVENTION

Figure 1:
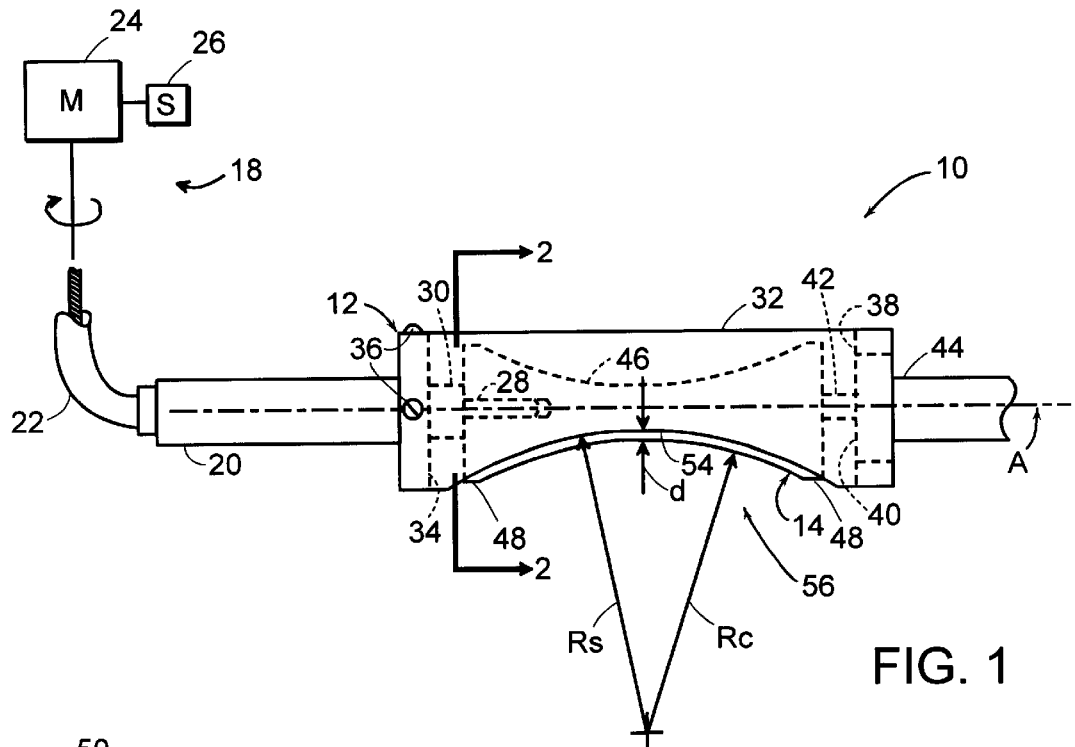
FIG. 1 is a schematic, side view of an apparatus for skinning frozen fish in accordance with one embodiment of the present invention.

Depicted in FIG. 1 is a schematic, side view of an apparatus 10 useful for skinning frozen fish in accordance with a preferred embodiment of the present invention. The frozen fish skinning apparatus 10 includes a housing 12 configured to be grasped at at least one location by a user, a rotary cutter 14 disposed substantially fully within the housing 12, except for an exposed sector portion 16 thereof, and a source of rotational power, shown generally at 18.

The housing 12 may be further subdivided into a plurality of elements, generally symmetrical about a longitudinal axis, A, thereof. In one embodiment, the housing 12 includes a cylindrical handle assembly 20 of the type conventionally used at the working end of a flexible power transmission cable 22. The cable 22 may be integral with the handle assembly 20 or releasably coupled thereto. The distal end of the cable 22 is coupled to a shaft of an electric motor 24 operated by switch 26, although a rotational power source other than an electric motor may be employed as well as any form of switch including those which mechanically decouple the power source from the shaft 22 such as a clutch mechanism. The rotational power source may be fixed speed or variable speed. As will become readily apparent, advantageous operation of the invention is not limited to the specific elements depicted and the scope of the invention is meant to include all variants and alternative embodiments which rely on the inventive concepts disclosed herein. In an exemplary embodiment, cable 22 has a rotating core diameter of about one cm and a length of about 1.2 meters; motor 24 is a ⅓ horsepower, 1725 rpm alternating current electric motor; and switch 26 is a manually actuated electrical switch, although a foot operated switch may be used. It is contemplated that the cutter 14 of the diameter herein should rotate without load at at least 1000 rpm.

The handle assembly 20 transmits the rotation and torque of the cable 22 through an internal bearing arrangement to an axially extending threaded stud 28 which is threadedly engaged with the rotary cutter 14. The threading is oriented such that during operation, the cutter 14 self-tightens on the stud 28. A cylindrical metal bushing 30 which rotates with the stud 28 provides radial stability to the cutter 14 during high speed rotation, limiting cutter radial deflection when under load as will be described in more detail hereinbelow.

The housing 12 further includes a generally cylindrical shield 32 which encloses the cutter 14, except for sector 16, to safeguard the user, as well as provide distal support for the cutter 14. The shield is releasably attached with a close fit to a cylindrical flange 34 of the handle assembly 20 by a plurality of radially disposed machine screws 36. A shaft 42 extending from the distal end of the cutter 14 is supported in a sealed rolling element bearing 40 disposed in annular bearing support 38. Slight interference fits are provided between the mating surfaces of shaft 42, bearing 40, bearing support 38 and shield 32 to prevent relative slippage therebetween during operation while facilitating disassembly for repair or maintenance. The shield 32 also includes an axially extending handle 44 welded thereto so that a user can grasp both the handle 44 and handle assembly 20 to more precisely maneuver and control the skinning apparatus 10 during use. In general, the handle assembly 20, shield 32, and handle 44 lie along a common longitudinal axis which is collinear with an axis of rotation and symmetry of the cutter 14.

The components of the skinning apparatus 10 may be made from any materials which are both approved for use in the food processing industry and which exhibit sufficient durability and strength to meet the stresses imposed during high speed, high load operation. In an exemplary embodiment, the shield 32, handle 44, cutter 14, and shaft 42 are manufactured from stainless steel, the bushing 30 is made of brass, and the flange 34 and bearing support 38 are made from ultra high molecular weight (UHMW) polymer material. UHMW polymer is a tough, nonporous material exhibiting high lubricity and is commonly used in the food processing industry in applications such as cutting boards and other cutting surfaces due to its amenability to sterilization. Handle assembly 20 and cable 22 are conventional and any suitably sized and configured components approved for use in food processing may be employed.

The stainless steel cutter 14 is a generally symmetrical, cylindrical member of unitary construction having a concave, contoured side 46 of substantially uniform radius of curvature $R_c$. As will be discussed further hereinbelow, the value of $R_c$ is selected to at least match the flattest contour of the frozen fish to be skinned. In order to prevent gouging or slicing of the underlying flesh once the skin has been removed, the end portions 48 of cutter 14 may be blunted as depicted, so as to deviate from the contour of radius $R_c$.

Figure 2:
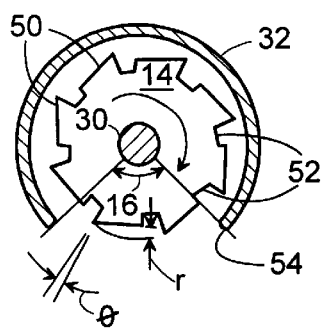
FIG. 2 is an enlarged schematic, sectional end view of a rotary cutter and shield taken along line 2—2 of FIG. 1 in accordance with an exemplary embodiment of the present invention.

The orientation and configuration of the plurality of integral, longitudinally extending teeth 50 may best be seen in FIG. 2, wherein there is depicted an enlarged schematic, end or radial view of cutter 14 disposed in shield 32 taken along line 2—2 of FIG. 1 in accordance with an exemplary embodiment of the present invention. The terminology employed in describing the relevant features of cutter 14 is consistent with that used to describe similar features of conventional milling cutters. In this particular embodiment, the cutter 14 has eight identical, equally circumferentially spaced teeth 50 which extend fully across the face width or longitudinal length of the cutter 14. A cylindrical blank is first machined to the desired concave contour. The teeth 50 are then integrally machined in the cutter 14, for example by milling eight longitudinally extending flutes 52 across the face width then grinding radial relief, r, on respective tooth trailing edges as depicted resulting in angled surfaces between respective leading edges and trailing edges of the teeth 50. Since the cutting edges of the teeth 50 form the concave, contoured side 26 of the cutter 14, the teeth 50 will have a greater radial height proximate end portions 48 than near the center of the cutter 14. Radial height of the flutes 52 may track tooth height or may be constant, as desired. While it is generally easier to machine constant height flutes 52, the greater the face width and the smaller the radius, $R_c$, the greater will be the unsupported tooth height at the end portions 48.

In an exemplary eight tooth cutter 14, having a maximum cutter diameter at the end portion 48 thereof of about 5 cm and a face width of about three times that value or about 15 cm, the circumferential span of each tooth 50 is about 30° and that of each flute 52 is half that value or about 15°. Typical radial height of each tooth may be about 30% of maximum cutter radius or 0.75 cm and radial relief may be about half that value or about 0.375 cm. Radial rake angle, θ, will depend on the orientation and shape of the milling cutter during the initial fluting step but should be in the range of zero degrees to positive 10° or more, a positive angle being generally preferred to keep the cutter engaged with the frozen loin. In this particular example, the contour radius, $R_c$, is about 30 cm. A cutter 14 according to these dimensions has been found to perform well with the 14 kg to 18 kg frozen swordfish loins discussed hereinabove, although clearly, the values may be varied to tailor the cutter 14 to a particular type and size of frozen fish. Of particular import, however, is that there exist a sufficient number of teeth 50 and sufficient flute depth such that the cutter 14 does not become clogged with removed skin as the frozen fish is traversed. The thicker the layer of skin to be removed, the greater the requisite flute depth for a given number of teeth 50, cutter rotational speed, and apparatus traverse speed.

Referring again also to FIG. 1, in order to limit the depth of cut of the cutter 14, the shield 32 has a tailored aperture 54 therein to expose solely a limited radial extent of a sector portion 16 of the cutter and thereby create a working zone, shown generally at 56. Contour of the tailored aperture 54 should generally match the contoured side 46 of the cutter, for example by having a uniform radius of curvature, $R_s$, equivalent to the sum of cutter radius $R_c$, and the depth of cut, d, desired. The working zone 56 extends substantially between the two end portions 48 in the longitudinal direction and through the circumferential extent of the exposed sector portion 16. Typically, the desired depth of cut selected is about equivalent to the average thickness of frozen skin and any underlying fat layer to be removed from the fish. In the case of typical swordfish loins processed by the apparatus 10, a desirable depth of cut is in the range of between about 0.3 cm to about 0.5 cm.

Figure 3:
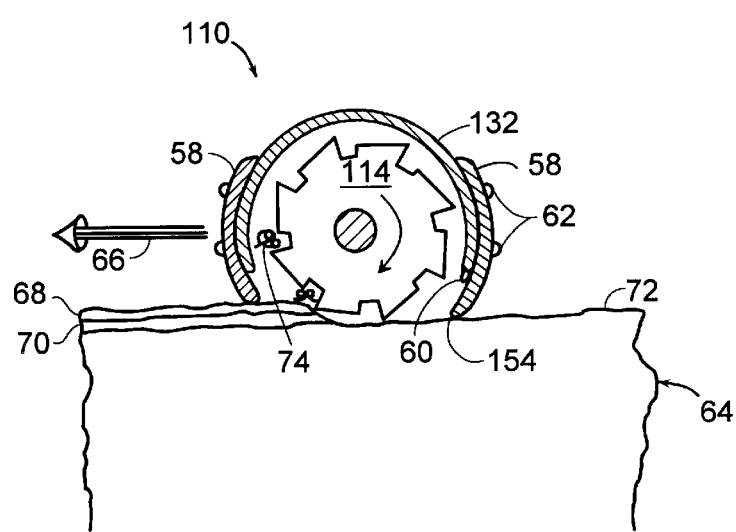
FIG. 3 is an enlarged schematic, sectional end view similar to that depicted in FIG. 2 of a rotary cutter and adjustable guide in accordance with a method and an alternate structural embodiment of the present invention.

As cutter 14 wears, the cutting edges of the teeth 50 can be renewed simply by grinding additional radial relief, r, on the teeth trailing edges. Changes to tooth radial height and cutter side contour 46 will affect the depth of cut in the working zone 56; therefore, matching changes to the tailored aperture 54 would be required to maintain a constant depth of cut. Instead of permanently modifying the aperture 54 by removing material from shield 32, adjustable guides 58 may be added to a shield 132 with an oversized opening 60 as depicted in FIG. 3 to create an adjustable tailored aperture 154. The adjustable guides 58 are arcuate in cross-section and configured to intimately nest with shield 132. The guides 58 may be attached to the shield 132 by any suitable means, for example by threaded fasteners 62 threadedly engaged with the shield 132 and passing through clearance holes in the guides 58. To facilitate depth of cut adjustment, the guide clearance holes may be elongated in the circumferential direction. Further, matched sets of guides 58 and blades 114 can be made to facilitate rapid changeover from a particular radius of curvature cutter 114 to another.

As depicted in FIG. 3, the guides 58 are adjusted such that as the cutter 114 rotates in the clockwise direction and the apparatus 110 traverses a frozen portion of fish 64 from right to left, as generally indicated by arrow 66, solely the frozen skin 68 and fat layer 70 are removed, leaving the frozen flesh 72 substantially untouched. A similar denuding occurs when using the apparatus 10 having a properly configured aperture 54. Due to the high angular velocity of cutter rotation and configuration of the cutter 114, swarf chips of removed skin and fat, shown generally at 74, are readily discharged from the fluting of the cutter 114. The shield 132 may be adapted to include a longitudinally extending discharge slot to provide a means of egress for the swarf 74, although in practice, it has been found that swarf 74 is automatically cleared from the shield 132. Clearing may occur, for example, when the apparatus 110 is reoriented on the frozen fish 64 to remove the skin 68 and fat 70 from a subsequent area, or alternatively when the radius of curvature of the portion of fish 64 being denuded is less than $R_c$, the radius of curvature of the cutter 114, such that solely a limited longitudinal portion of the cutter 114 is actively removing skin 68 and fat 70.

Figure 4:
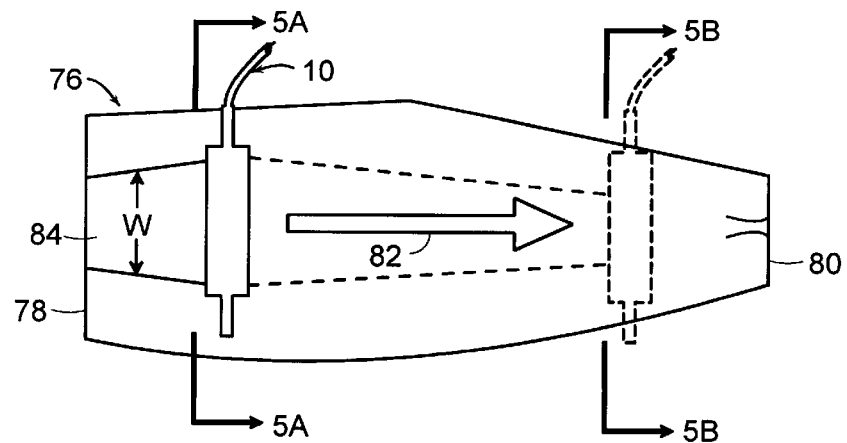
FIG. 4 is a schematic plan view of the skinning apparatus in use skinning a frozen loin of swordfish in accordance with an embodiment of the present invention.

Referring now to FIG. 4, depicted therein is a schematic plan view of the skinning apparatus 10 in use skinning a frozen loin of swordfish 76 in accordance with an embodiment of the present invention. The user is not shown for clarity; however, the apparatus 10 may typically be grasped like a rolling pin, with one hand on the handle assembly 20 and the other on handle 44. The user may stand alongside the loin 76 and traverse the loin 78 with the apparatus 10 from the head end 78 to the tail end 80, shown generally by arrow 82 and features in phantom. Depth of cut is automatically limited by the tailored aperture 54. As the loin 76 is traversed, the width, W, of denuded flesh 84 may tend to vary, being a function of the local contour of the loin 76. For example, as depicted in FIG. 4, the width, W, first increases then decreases as the apparatus travels from head 78 to tail 80 corresponding to an increase then decrease in local radius of contour of the fish. The cutter contour radius, $R_c$, is selected to be substantially equivalent to or slightly greater than the maximum anticipated local radius of contour of the fish to ensure that the entire fish can be denuded by the apparatus 10. Upon reaching the tail end 80, the user may return to the head end 78 and reorient the apparatus 10 to one side or other of the denuded flesh 84 and repeat the process until substantially all of the frozen skin and fat layer are removed.

Figures 5A, 5B:
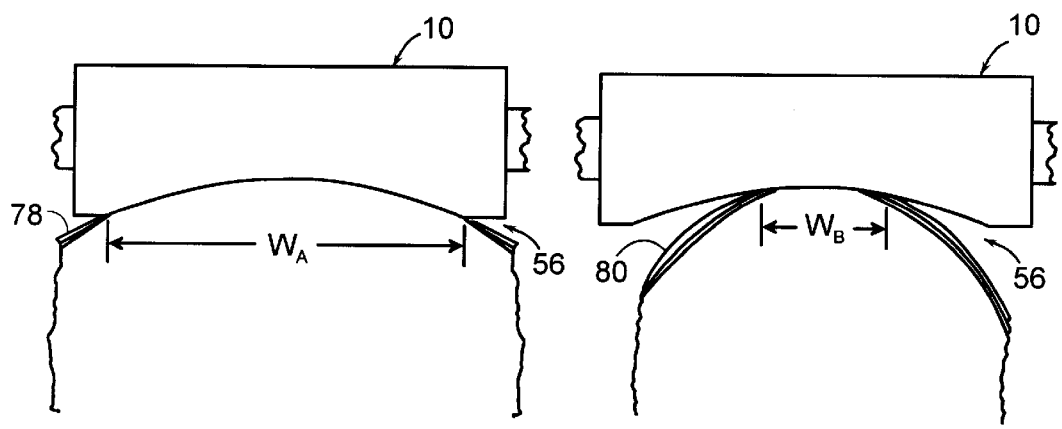
FIG. 5A is a schematic cross-sectional view of the frozen loin of swordfish taken along line 5A—5A of FIG. 4 in accordance with an embodiment of the present invention.
FIG. 5B is a schematic cross-sectional view of the frozen loin of swordfish taken along line 5B—5B of FIG. 4 in accordance with an embodiment of the present invention.

The reason for the varying width of denuded flesh 84 in a single traverse may be appreciated by reference to FIGS. 5A and 5B which are respective schematic cross-sectional views of the frozen loin 76 taken along lines 5A—5A and 5B—5B of FIG. 4. In FIG. 5A, the cutter radius $R_c$ is substantially equivalent to the local contour or radius of the head end 78; therefore, skin and fat are removed across the entire face width or longitudinal extent of the working zone 56, depicted as $W_A$. Similarly, when the local radius of the loin 76 is substantially less than the cutter radius $R_c$, such as at tail end 80 as shown in FIG. 5B, skin and fat are removed solely across a limited longitudinal extent of the working zone 56, depicted as $W_B$ and swarf is readily discharged on either side thereof. In both cases, however, the depth of cut is substantially limited to a constant value, set by the cooperation of the cutter 14 and the shield 32.

Since the working zone 56 has a contoured cross-section, the apparatus 10 need not be restricted to a horizontal orientation during skin removal, but can be tilted as desired to most efficiently process the portion of the loin 76 being denuded. In other words, a user can select any starting location and plunge the apparatus into the loin 76 until the shield 32 contacts the loin 76. The user is then free to traverse the apparatus 10 towards any other location along a skin-covered path, confident that substantially all that will be removed is waste skin and fat. Further, due to the design of the cutter 14, which effectively removes the skin when traversed in feed direction 82 only, a user can allow the apparatus 10 to ride lightly on denuded flesh 84 as the apparatus is being retracted and reoriented in preparation for a subsequent feed direction traverse 82.

In a preferred method, the loin 76 is thoroughly frozen at the time of processing, for example by being maintained in a blast freezer with an ambient temperature of between about −20 ° C. to about 15° C. The colder the loin 76, the more readily the brittle, frozen skin 68 is chipped and removed according to the method and apparatus of the invention. At these temperatures, the fat layer 70 remains somewhat viscous, providing further protection to the underlying frozen fresh 72 from the action of the cutter 14. The viscous fat 70 also tends to lubricate and thereby facilitate traverse of the apparatus 10 across the loin 76 providing for smooth, continuous cutting and minimal user fatigue.

In a typical application, a loin 76 is removed from a freezer bin, impaled upon short vertical spikes extending from a workstation surface, and efficiently denuded of substantially all skin and fat with negligible flesh loss. Any flat spots or depressed areas of skin which are not processed by the apparatus may be readily dressed using a knife; however, it has been found that such manual finishing is rarely required, and then only to a very limited extent. In general, complete cycle time for denuding a loin 76 in the 14 kg to 18 kg range is well under a minute, generally averaging between about 30 to 45 seconds per loin 76.

While there have been described herein what are to be considered exemplary and preferred embodiments of the present invention, other modifications of the invention will become apparent to those skilled in the art from the teachings herein. For example, the cutter 14 may have as few as three or more than eight teeth 50 and the teeth 50 may be helically, rather than longitudinally disposed. For particular high volume or special applications which justify the expense of manufacture of dedicated, limited use cutters 14, the contour 46 of a particular cutter 14 may be other than arcuate, being configured to closely match a particular contour of the fish being denuded. Exemplary contours 26 include those that are generally parabolic, partially ellipsoidal, serpentine, convex, spherical, and other nonlinear shapes. Further, the cutter 14 need not be generally cylindrical, in accordance with the selected superimposed contour 46, but may be partially or fully tapered, conical, frustoconical or a combination thereof. Yet further, a plurality of cutters 14 may be employed, arranged serially or in parallel, with co-rotating or counter-rotating orientations. A gearset or multiple cables 22 may be provided as required to power the cutters 14.

It is therefore desired to be secured in the appended claims all such modifications as fall within the true spirit and scope of the invention. Accordingly, what is desired to be secured by Letters Patent is the invention as defined and differentiated in the following claims.

We claim:

1. An apparatus for skinning a frozen fish comprising,
   a housing configured to be grasped by a user, said housing having an axis and including a shield forming an aperture therein;
   a cutter supported for rotation within said shield along an axis parallel to said housing axis, said cutter comprising a generally cylindrical member having a contoured side formed by a plurality of longitudinally extending teeth having trailing edge radial relief resulting in angled surfaces between respective leading edges and trailing edges of the teeth, wherein at least a portion of said cutter is exposed by said shield proximate said aperture to form a working zone; and
   means for transmission of torque to said cutter coupled in driving engagement therewith.

2. The invention according to claim 1 wherein said contoured cutter is generally concave.

3. The invention according to claim 2 wherein said concave cutter side has a radius of curvature, $R_c$, substantially equivalent to or greater than a maximum radius of curvature of a portion of fish to be denuded.

4. The invention according to claim 1 wherein each tooth has a zero or positive degree radial rake angle, $\theta$.

5. The invention according to claim 1 wherein said cutter comprises at least three teeth.

6. The invention according to claim 1 wherein said cutter comprises stainless steel.

7. The invention according to claim 1 further comprising a guide disposed proximate said working zone to limit cutter depth of cut, d.

8. The invention according to claim 7 wherein said guide has a radius of curvature $R_s$, said contoured cutter side has a radius of curvature $R_c$, and $R_s$ is greater than by $R_c$ by about the depth of cut.

9. The invention according to claim 7 wherein said guide is integral with said shield.

10. The invention according to claim 7 wherein said guide is adjustable.

11. The invention according to claim 10 wherein said guide is adjustable.

12. The invention according to claim 7 wherein the depth of cut is less than or substantially equivalent to a thickness of skin and underlying fat layer, if any, of a portion of fish to be d denuded.

13. The invention according to claim 1 further comprising a motor driven flexible power transmission cable and wherein said torque transmission means comprises a handle assembly attached thereto.

14. The invention according to claim 13 wherein said cutter rotates without load at about 1000 rpm or greater.

15. A method of skinning a frozen fish comprising the steps of:
   providing at least a portion of fish having an outer layer of frozen skin and an inner layer of frozen comestible flesh;
   applying a limited depth rotary cutter apparatus to said frozen skin at a first location to remove said frozen skin thereat without removing substantially any frozen flesh wherein the apparatus includes a cutter comprising a generally cylindrical member having a contoured side formed by a plurality of longitudinally extending teeth having trailing edge radial relief resulting in angled surfaces between respective leading edges and trailing edges of the teeth; and
   traversing the frozen fish with the apparatus to a next location to denude the frozen fish of said frozen skin between said first and next locations.

16. The invention according to claim 15 wherein said applying and traversing steps are repeated until substantially all of said frozen skin is removed.

17. A skinned frozen fish produced in accordance with the method of claim 17.

18. The invention according to claim 15 wherein apparatus cutter depth is substantially equivalent to or less than a thickness of frozen skin and underlying fat layer, if any, of the portion of fish to be denuded.

19. A method of skinning a frozen loin of swordfish comprising the steps of:

provi ding a loin of swordfish having an outer layer of frozen skin and an inner layer of frozen comestible flesh;

applying a limited depth rotary cutter apparatus to said frozen skin at a first location to remove said frozen skin thereat without removing substantially any frozen flesh wherein the apparatus includes a cutter comprising a generally cylindrical member having a contoured side formed by a plurality of longitudinally extending teeth having trailing edge radial relief resulting in angled surfaces between respective leading edges and trailing edges of the teeth;

traversing the frozen loin with the apparatus to a next location to denude the frozen loin of said frozen skin between said first and next locations; and repeating said applying and traversing steps until substantially all of said frozen skin is removed.

20. The invention according to claim 19 wherein the loin further includes a layer of fat disposed between the frozen skin and the frozen flesh and said apparatus also removes said fat layer.

21. A skinned frozen loin of swordfish produced in accordance with the method of claim 20.

* * * * *